United States Patent
Shim

(10) Patent No.: US 11,354,069 B2
(45) Date of Patent: Jun. 7, 2022

(54) METHOD OF REDUCING STORAGE CAPACITY FOR BIG DATA PROCESSING

(71) Applicant: SK hynix Inc., Gyeonggi-do (KR)

(72) Inventor: Eung Bo Shim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/036,879

(22) Filed: Sep. 29, 2020

(65) Prior Publication Data

US 2021/0326070 A1 Oct. 21, 2021

(30) Foreign Application Priority Data

Apr. 20, 2020 (KR) .......................... 10-2020-0047433

(51) Int. Cl.
G06F 3/06 (2006.01)

(52) U.S. Cl.
CPC ............ G06F 3/0659 (2013.01); G06F 3/067 (2013.01); G06F 3/0608 (2013.01)

(58) Field of Classification Search
CPC ...... G06F 3/0659; G06F 3/0608; G06F 3/067; G06F 3/0626; G06F 3/0635; G06F 3/0638; G06F 3/0646; G06F 3/065; G06F 3/0655; G06F 16/125; G06F 16/134; G06F 16/1744
See application file for complete search history.

(56) References Cited

U.S. PATENT DOCUMENTS

| 5,742,792 A | * | 4/1998 | Yanai | G06F 11/2074 711/162 |
| 6,442,659 B1 | * | 8/2002 | Blumenau | G06F 11/1076 711/114 |

FOREIGN PATENT DOCUMENTS

| KR | 10-1671388 | 11/2016 |
| KR | 10-1948391 | 2/2019 |

OTHER PUBLICATIONS

Apache Hadoop 3.2.1—HDFS Architecture, httpshadoop.apache. orgdocscurrenthadoop-project-disthadoop-hdfsHdfsDesign.html#Data_ Replication, Sep. 22, 2019.

* cited by examiner

Primary Examiner — Larry T MacKall
(74) Attorney, Agent, or Firm — IP & T Group LLP

(57) ABSTRACT

An operating method of a data storage system comprising a processor and multiple storage devices, the operating method comprising: a first storage operation of selecting a first storage device, a second storage device, and a third storage device among the multiple storage devices and transmitting and storing data generated by the processor in the first storage device and the second storage device, a second storage operation of transmitting, to the third storage device, the data stored in the second storage device and compressing and storing the data in the third storage device, a first access operation of accessing the data in the first storage device, by the processor, after the first storage operation is completed, and a second access operation of accessing the data in the second storage device after fail of the first access operation.

16 Claims, 9 Drawing Sheets

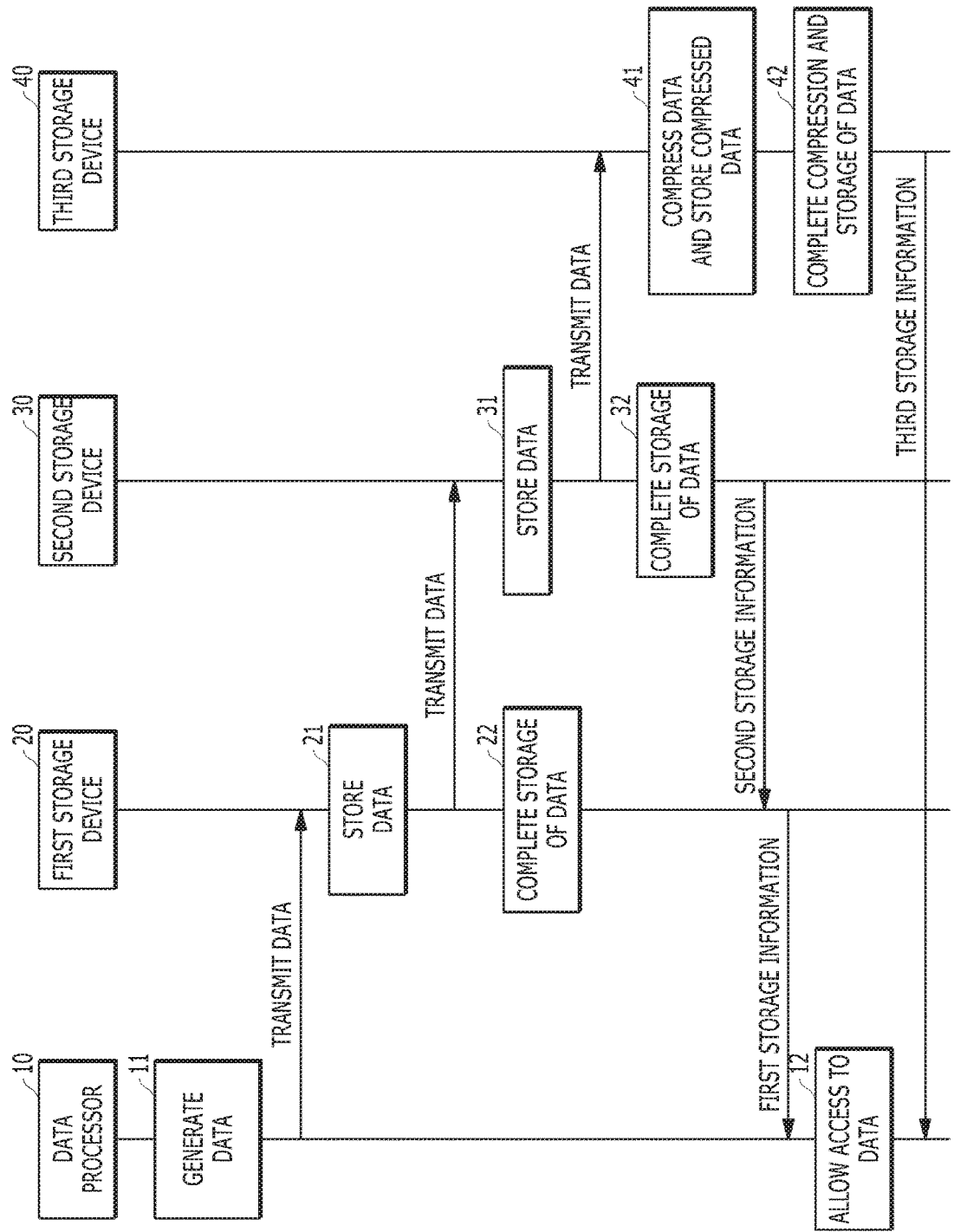

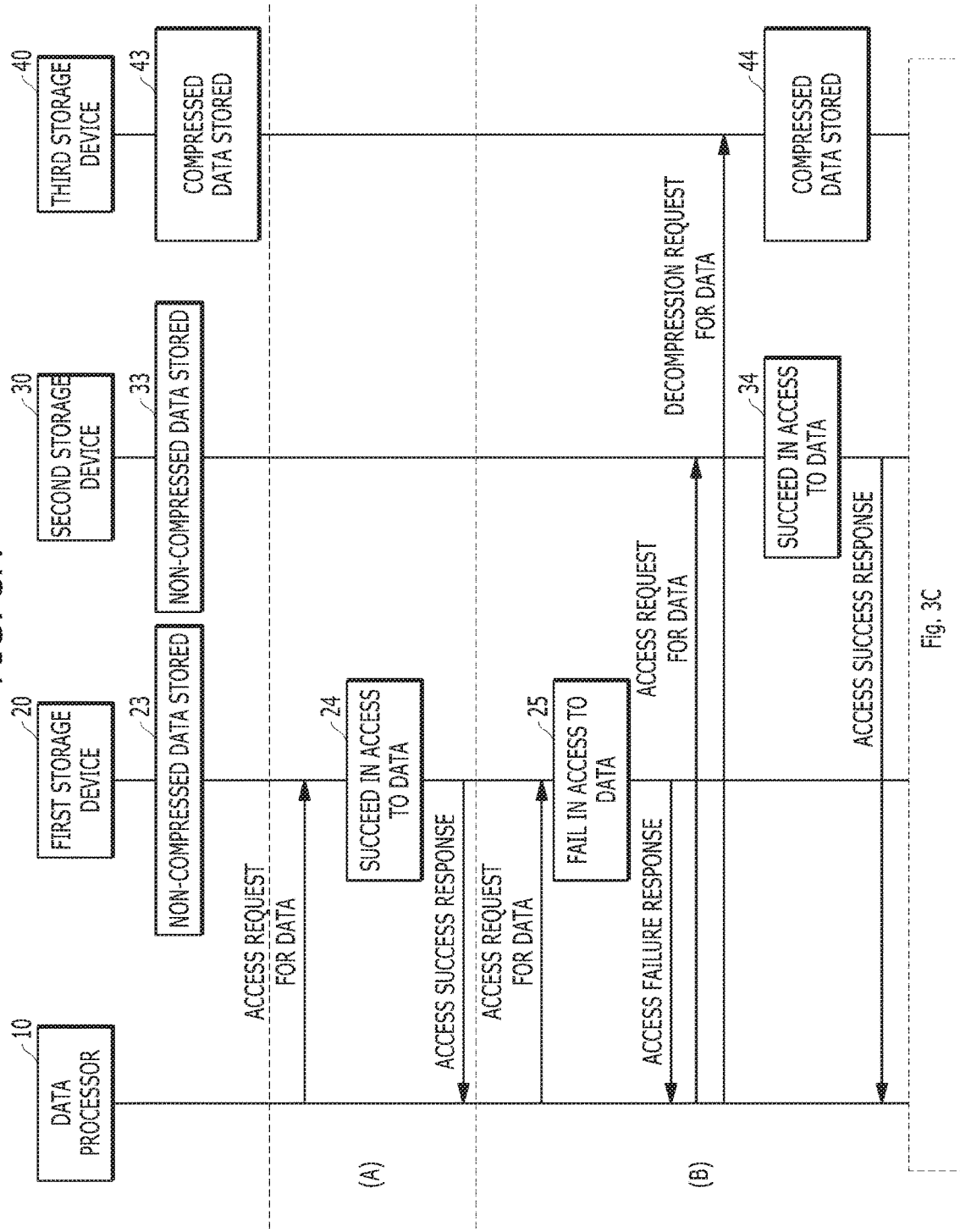

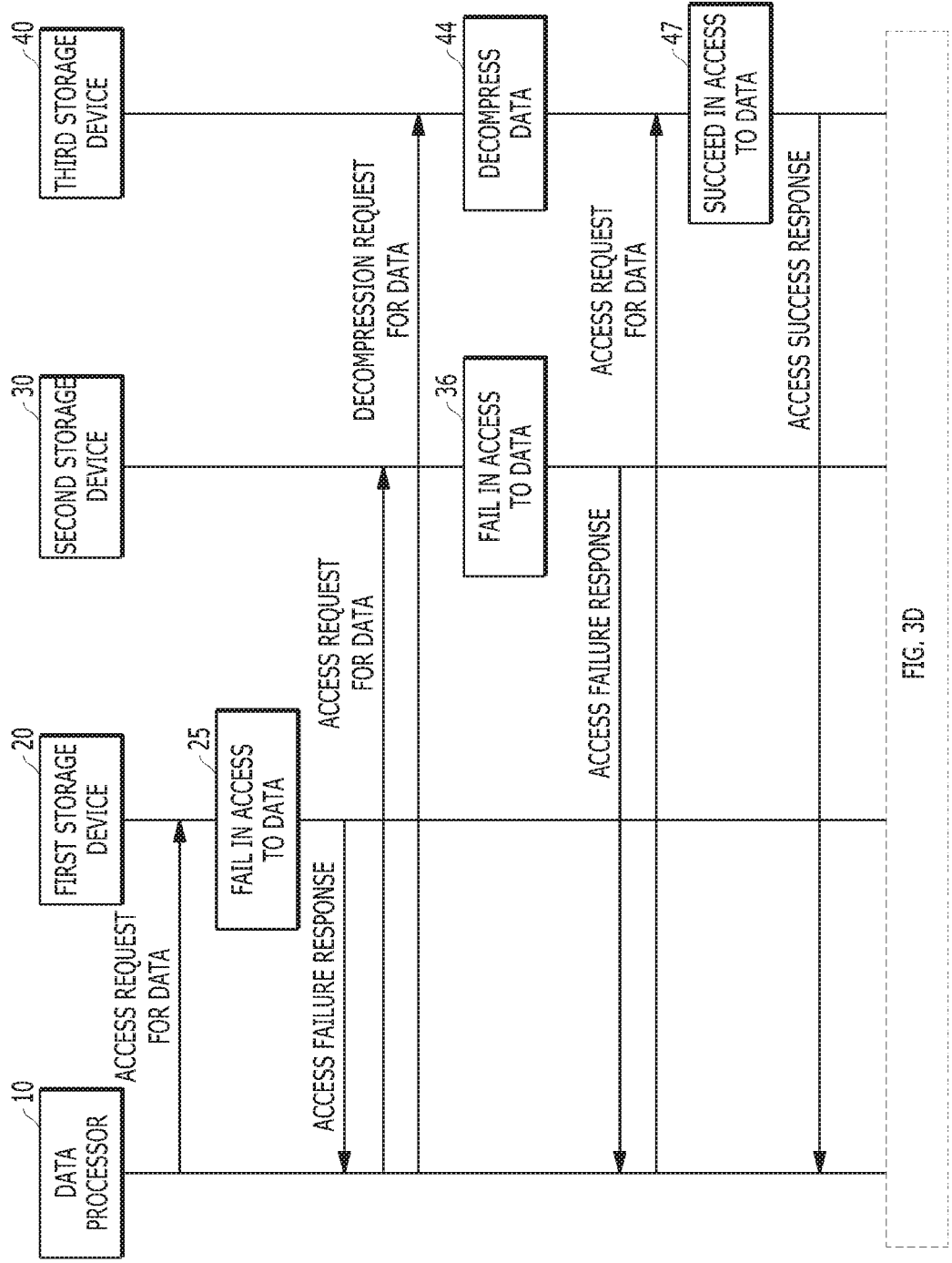

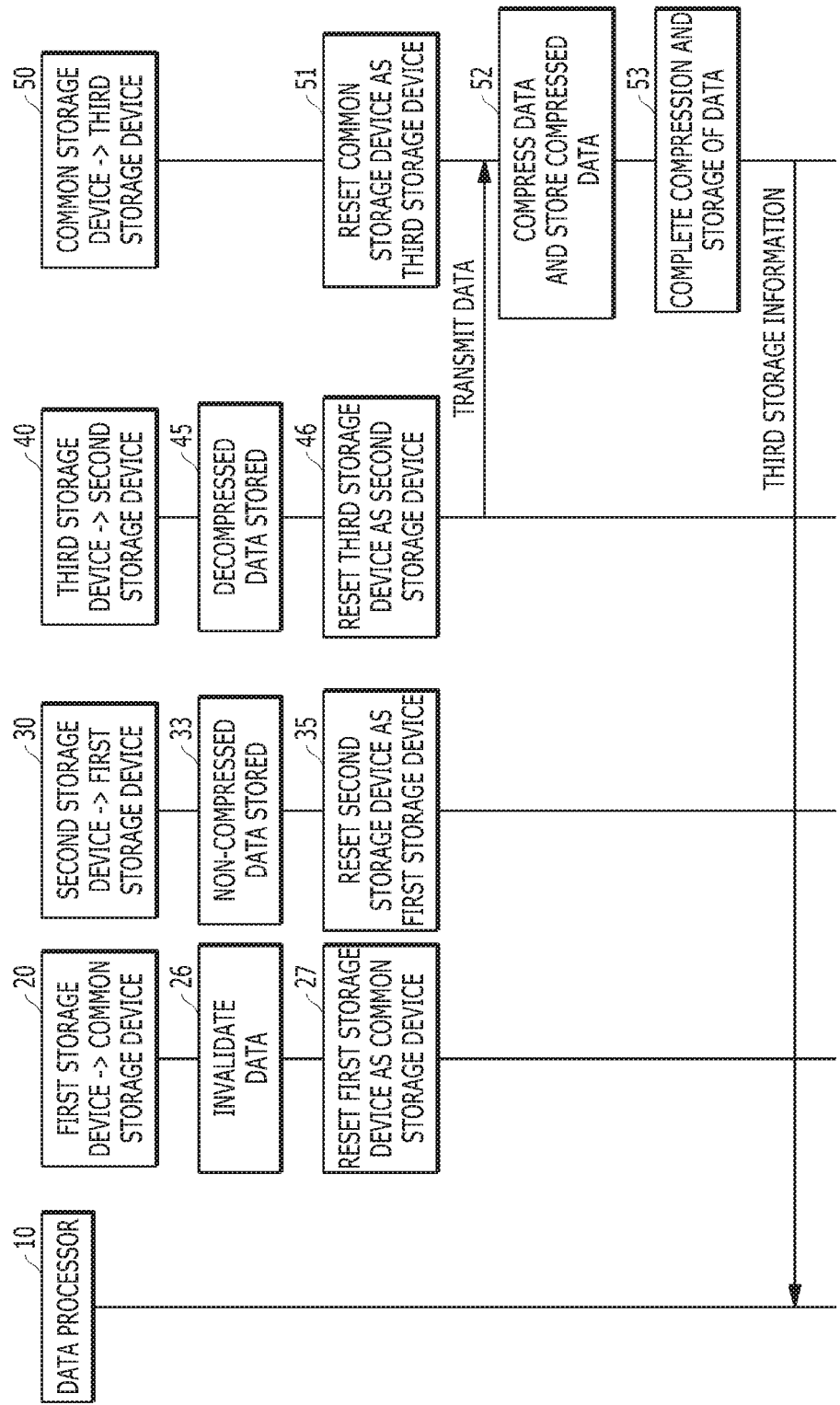

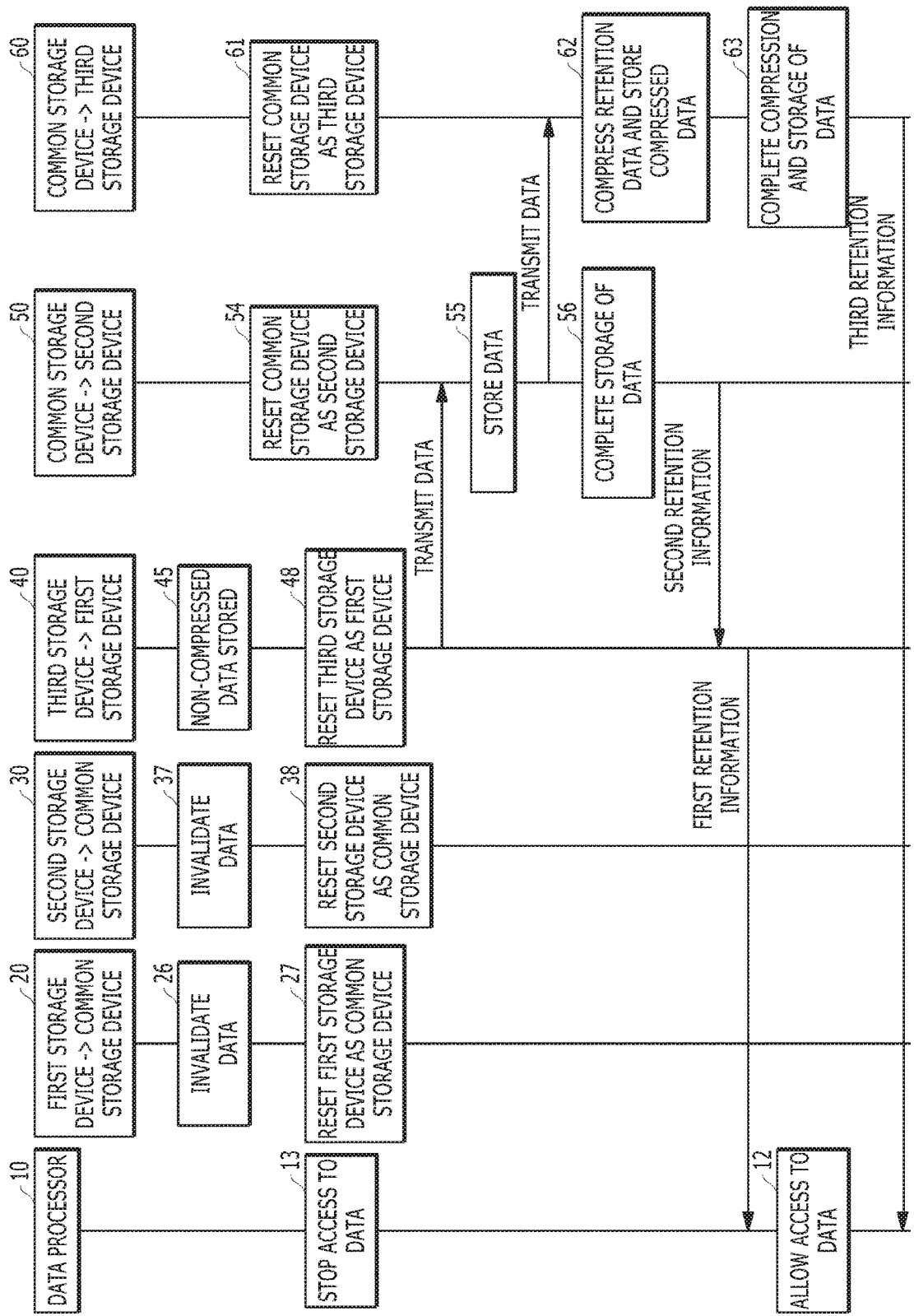

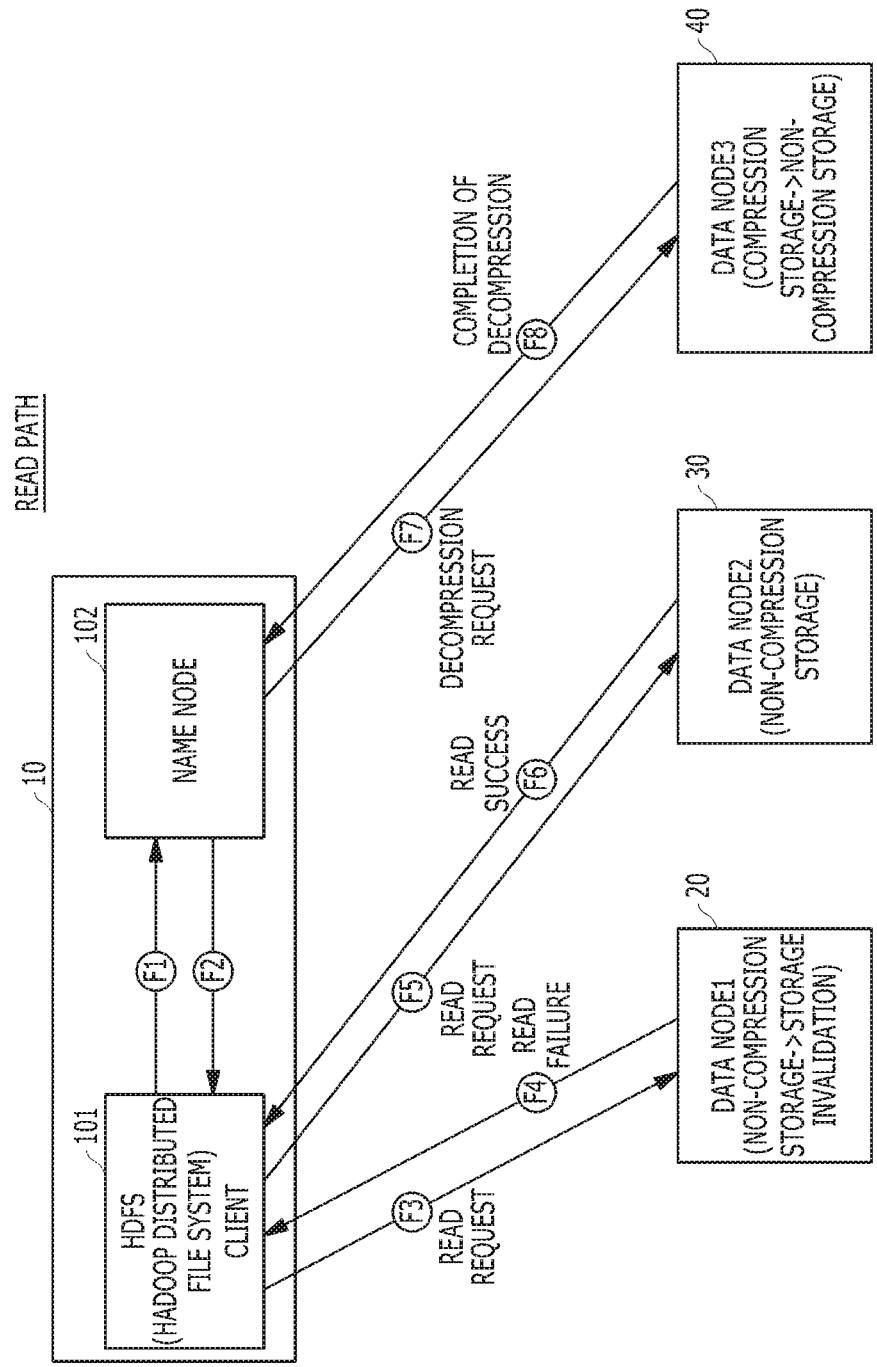

METHOD OF REDUCING STORAGE CAPACITY FOR BIG DATA PROCESSING

CROSS-REFERENCE TO RELATED APPLICATION

This application claims priority under 35 U.S.C. § 119 to Korean Patent Application No. 10-2020-0047433 filed on Apr. 20, 2020, which is incorporated herein by reference in its entirety.

BACKGROUND

1. Field

Various embodiments relate to a data storage system, and particularly, to a method of reducing a storage capacity for big data processing.

2. Discussion of the Related Art

Big data refers to a set of very big and complicated data. A large amount of data up to several terabytes or several petabytes is generated within a short time. As the amount of data to be processed increases, there has emerged a need for a file system capable of storing a large amount of data in distributed servers and rapidly processing the stored data.

Hadoop refers to open source software capable of clustering, distributing and processing a large amount of data. Hadoop has been in the spotlight among all of big data systems because Hadoop has the ability to analyze, store and process a large amount of data.

Hadoop uses a method of storing data in several servers and simultaneously processing the data by the servers. Accordingly, a Hadoop Distributed File System (HDFS) divides big data into a plurality of unit data each having a predetermined size. The HDFS uses a method of distributing and storing the divided unit data by self-duplicating the divided unit data into multiple storage devices. For example, the HDFS may use a method of distributing and storing unit data by redundantly duplicating the data three times.

SUMMARY

Various embodiments are directed to a method capable of minimizing a space occupied by retention data in a data storage system in which the retention data are redundantly duplicated and used for big data processing.

In an embodiment, an operating method of a data storage system comprising a processor and multiple storage devices, the operating method may include: a first storage operation of selecting a first storage device, a second storage device, and a third storage device among the multiple storage devices and transmitting and storing data generated by the processor in the first storage device and the second storage device; a second storage operation of transmitting, to the third storage device, the data stored in the second storage device and compressing and storing the data in the third storage device; a first access operation of accessing the data in the first storage device, by the processor, after the first storage operation is completed; and a second access operation of accessing the data in the second storage device after fail of the first access operation.

The first access operation and the second storage operation may be performed in parallel.

The operating method may further include a third storage operation of decompressing compressed the data in the third storage device and continuing to store decompressed the data in the third storage device after fail of the first access operation.

The second access operation and the third storage operation may be performed in parallel.

The operating method may further include: a reselecting operation of reselecting the second storage device as a new first storage device, reselecting the third storage device as a new second storage device, and then selecting a new third storage device among the multiple storage devices, after the third storage operation; and an operation of storing compressed the data in the new third storage device by performing the second storage operation with the new third storage device after the reselecting operation.

The first storage operation may include: a fourth storage operation of transmitting, to the first storage device, the data generated by the processor and then storing the data in the first storage device; and a fifth storage operation of transmitting the data from the first storage device to the second storage device and then storing the data in the second storage device.

The fourth storage operation and the fifth storage operation may be performed in parallel.

In an embodiment, an operating method of a data storage system comprising a processor and multiple storage devices, the operating method may include: a first storage operation of selecting a first storage device, a second storage device and a third storage device among the multiple storage devices and transmitting and storing data generated by the processor in the first storage device and the second storage device; a second storage operation of transmitting, to the third storage device, the data stored in the second storage device and compressing and storing the data in the third storage device; a first access operation of accessing the data in the first storage device, by the processor, after first storage information and second storage information are transmitted to the processor, the first and second storage information respectively indicating that the storage of the data in the first and second storage devices is completed; and a second access operation of accessing the data in the second storage device after fail of the first access operation.

The first access operation and the second storage operation may be performed in parallel.

The operating method may further include a third storage operation of decompressing compressed the data in the third storage device and continuing to store decompressed the data in the third storage device after fail of the first access operation.

The second access operation and the third storage operation may be performed in parallel.

The operating method may further include: a reselecting operation of reselecting the second storage device as a new first storage device, reselecting the third storage device as a new second storage device, and then selecting a new third storage device among the multiple storage devices, after the third storage operation; and an operation of storing compressed the data in the new third storage device by performing the second storage operation with the new third storage device after the reselecting operation.

The first storage operation may include: a fourth storage operation of transmitting, to the first storage device, the data generated by the processor and then storing the data in the first storage device; a fifth storage operation of transmitting the data from the first storage device to the second storage device and then storing the data in the second storage device; a first transmission operation of generating, by the second storage device, the second storage information in response to the completion of the fifth storage operation and transmitting the second storage information to the first storage device; and a second transmission operation of generating, by the first storage device, the first storage information in response to the completion of the fourth storage operation and transmitting the first storage information to the processor, after the first transmission operation.

The fourth storage operation and the fifth storage operation may be performed in parallel.

In an embodiment, a data storage system may include: multiple storage devices; and a processor suitable for: redundantly storing, in a first storage device, a second storage device, and a third storage device of the multiple storage devices, data generated within the processor, wherein the data are stored as non-compressed in the first storage device and the second storage device and the data are stored as compressed in the third storage device; and accessing the data in the first storage device, and then accessing the data in the second storage device while decompressing compressed the data in the third storage device when failing to access the data in the first storage device.

The processor may be further suitable for generating the data and transmitting the data to the first storage device, the first storage device may be suitable for storing, in the first storage device, non-compressed the data, received from the processor while transmitting, to the second storage device, non-compressed the data received from the processor, the second storage device may be suitable for storing, in the second storage device, non-compressed the data, received from the first storage device, while transmitting, to the third storage device, non-compressed the data received from the first storage device, and the third storage device may be suitable for compressing non-compressed the data, received from the second storage device, and storing compressed the data in the third storage device.

The second storage device may be further suitable for generating second storage information in response to the completion of the storage of non-compressed the data, received from the first storage device, in the second storage device and transmitting the second storage information to the first storage device, the first storage device may be further suitable for generating first storage information in response to the completion of the storage of non-compressed the data, received from the processor, in the first storage device and the reception of the second storage information from the second storage device, and transmitting the first storage information to the processor, the processor may be further suitable for accessing the data in the first storage device or the second storage device in response to the reception of the first storage information from the first storage device, and the third storage device may be further suitable for generating third storage information in response to the completion of the storage of compressed the data in the third storage device and transmitting the third storage information to the processor.

An operation of compressing and storing non-compressed the data, by the third storage device, and an operation of accessing the data in the first storage device or the second storage device, by the processor, may be performed in parallel.

In an embodiment, an operating method of first to fifth memory devices, the operating method may include: storing a non-compressed version of data into each of the first memory device and the second memory device and a compressed version of the data into the third memory device; accessing, when an access to the non-compressed version fails in the first memory device, the non-compressed version in the second memory device while decompressing the compressed version in the third memory device; invalidating, when the access to the non-compressed version in the second memory device is successful, the non-compressed version in the first memory device while storing the compressed version into the fourth memory device; and invalidating, when the access to the non-compressed version in the second memory device fails, the non-compressed versions in the first memory device and the second memory device while accessing the decompressed version in the third memory device and storing the non-compressed version into the fourth memory device and the compressed version into the fifth memory device.

BRIEF DESCRIPTION OF THE DRAWINGS

FIGS. 2A and 2B are diagrams illustrating examples of a data write operation of the data storage system according to various embodiments of the present disclosure.

FIGS. 3A to 3D are diagrams illustrating examples of a data read operation of the data storage system according to various embodiments of the present disclosure.

FIG. 5 is a diagram illustrating a data read operation of the data storage system, applied to an HDFS, according to an embodiment of the present disclosure.

DETAILED DESCRIPTION

Figure 1:
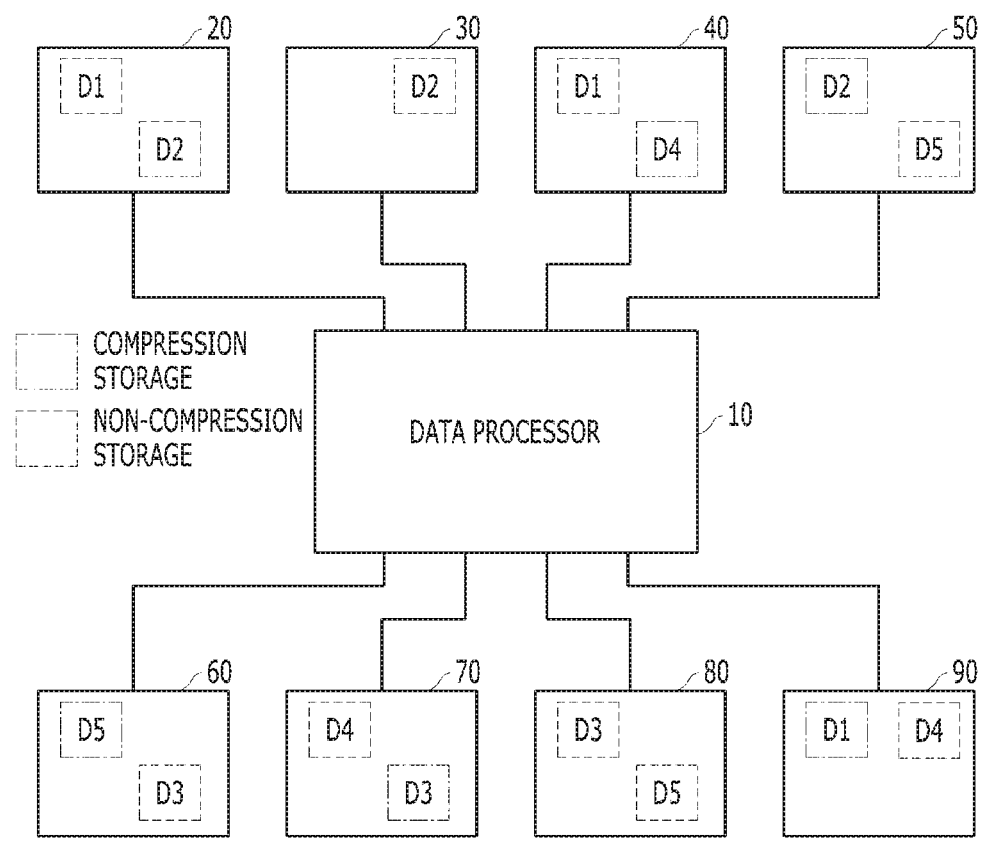
FIG. 1 is a diagram illustrating a data storage system according to an embodiment of the present disclosure.

Various examples of the disclosure are described below in more detail with reference to the accompanying drawings. Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

FIG. 1 is a diagram illustrating a data storage system according to an embodiment of the present disclosure.

Referring to FIG. 1, the data storage system according to an embodiment may include a data processor 10 and a plurality of data storage devices 20, 30, 40, 50, 60, 70, 80, and 90.

The data processor 10 may include electronic devices, for example, portable electronic devices, such as a mobile phone, an MP3 player and a laptop computer, or electronic devices, such as a desktop computer, a game machine, TV, and a projector. That is, the data processor 10 may include a computing device or a wired/wireless electronic device.

Furthermore, the data processor 10 includes at least one operating system (OS). The OS generally manages and controls the functions and operations of the data processor 10, and provides mutual operations between the data processor 10 and a user who uses the plurality of data storage devices 20, 30, 40, 50, 60, 70, 80, and 90. In this case, the OS supports functions and operations corresponding to a purpose and use of the user, and may be divided into a common OS and a mobile OS depending on the mobility of the data processor 10, for example. Furthermore, the common OS of the OS may be divided into an OS for private use and an OS for business depending on a use environment of a user. For example, the OS for private use is a system characterized to support a service provision function for a common user and includes Windows and Chrome. The OS for business is a system characterized to secure and support high performance, and may include Windows Server, Linux, and Unix. Furthermore, the mobile OS of the OS is a system characterized to support a mobility service provision function and a system power reduction function for users, and may include Android, iOS, and Windows Mobile. In this case, the data processor 10 may include multiple OSs and executes the OSs in order to perform operations corresponding to a user request along with the plurality of data storage devices 20, 30, 40, 50, 60, 70, 80, and 90. In this case, the data processor 10 transmits, to the plurality of data storage devices 20, 30, 40, 50, 60, 70, 80, and 90, multiple commands corresponding to the user request. Accordingly, the plurality of data storage devices 20, 30, 40, 50, 60, 70, 80, and 90 may perform operations corresponding to the multiple commands, that is, operations corresponding to the user request.

Furthermore, each of the plurality of data storage devices 20, 30, 40, 50, 60, 70, 80, and 90 operates in response to a request from the data processor 10. In particular, each data storage device may store data accessed by the data processor 10. In other words, each of the plurality of data storage devices 20, 30, 40, 50, 60, 70, 80, and 90 may be used as the primary storage device or secondary storage device of the data processor 10. Furthermore, each of the plurality of data storage devices 20, 30, 40, 50, 60, 70, 80, and 90 may be implemented as any one of various types of storage devices. For example, each of the plurality of data storage devices 20, 30, 40, 50, 60, 70, 80, and 90 may be implemented as any one of various types of storage devices, such as a multimedia card (MMC) of a solid state drive (SSD), MMC, embedded MMC (eMMC), reduced size MMC (RS-MMC) or micro-MMC type, a secure digital (SD) card of an SD, mini-SD or micro-SD type, a universal serial bus (USB) storage device, a universal flash storage (UFS) device, a compact flash (CF) card, a smart media card, and a memory stick.

Furthermore, the plurality of data storage devices 20, 30, 40, 50, 60, 70, 80, and 90 may be integrated into a single semiconductor device to form a memory card, and may configure a memory card, such as a PC card (e.g., personal computer memory card international association (PCMCTA)), a compact flash card (CF), a smart media card (e.g., SM or SMC), a memory stick, a multimedia card (e.g., MMC, RS-MMC or MMCmicro), an SD card (e.g., SD, mini-SD, micro-SD or SDHC), or a universal flash storage (UFS) device.

Furthermore, for another example, the plurality of data storage devices 20, 30, 40, 50, 60, 70, 80, and 90 may configure a computer, a ultra mobile PC (UMPC), a workstation, a netbook, personal digital assistants (PDA), a portable computer, a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, three-dimensional television, smart television, a digital audio recorder, a digital audio player, a digital picture recorder, a digital picture player, a digital video recorder, a digital video player, a storage configuring a data center, a device capable of transmitting and receiving information in a wireless environment, one of various electronic devices configuring a home network, one of various electronic devices configuring a computer network, one of various electronic devices configuring a telematics network, a radio frequency identification device (RFID) or one of various elements configuring a computing system.

Furthermore, each of the plurality of data storage devices 20, 30, 40, 50, 60, 70, 80, and 90 may include a storage region (not illustrated). Furthermore, the storage region (not illustrated) included in each of the plurality of data storage devices 20, 30, 40, 50, 60, 70, 80, and 90 may include volatile memory devices, such as a dynamic random access memory (DRAM) and a static RAM (SRAM), and nonvolatile memory devices, such as a read only memory (ROM), a mask ROM (MROM), a programmable ROM (PROM), an erasable PROM (EPROM), an electrically erasable PROM (EEPROM), a ferromagnetic RAM (FRAM), a phase change RAM (PRAM), a magnetic RAM (MRAM), a resistive RAM (RRAM), and a flash memory.

In an embodiment, the data processor 10 may read/write data from/in the plurality of data storage devices 20, 30, 40, 50, 60, 70, 80, and 90. In particular, the data processor 10 may duplicate each of multiple pieces of data D1, D2, D3, D4, and D5, and may redundantly store (i.e., store multiple times) the duplicated data in N data storage devices of the plurality of data storage devices 20, 30, 40, 50, 60, 70, 80, and 90, where N may be set as a natural number equal to or more than 2. For convenience of description, the following example is described with N being set to 3.

For example, the data processor 10 may redundantly store the first data D1 of the multiple pieces of data D1, D2, D3, D4, and D5 in three of the plurality of data storage devices 20, 30, 40, 50, 60, 70, 80, and 90, that is, the first storage device 20, the third storage device 40 and the eighth storage device 90. In this case, the first data D1 stored in each of the first storage device 20 and the third storage device 40 may be stored without compression. In contrast, the first data D1 stored in the eighth storage device 90 may be compressed. As described above, the size of the compressed first data D1 stored in the eighth storage device 90 may be smaller than the size of the non-compressed first data D1 stored in each of the first storage device 20 and the third storage device 40.

Furthermore, when performing an access operation on the first data D1, the data processor 10 may preferentially perform the access operation for the non-compressed first data D1 in the first storage device 20 or the third storage device 40. If the access operation for the non-compressed first data D1 fails in any one storage device of the first storage device 20 and the third storage device 40, the data processor 10 may perform the access operation for the first data D1 in the other storage device 40 or 20 in parallel to an operation of decompressing the compressed first data D1 stored in the eighth storage device 90. Accordingly, the decompressed first data D1 may be stored in the eighth storage device 90. That is, although the access operation for the first data D1 fails in the other storage device 40 or 20, the data processor 10 may access the decompressed first data D1 in the eighth storage device 90.

In the aforementioned description, the operation of redundantly storing, by the data processor 10, the first data D1 in the three storage devices, that is, the first storage device 20, the third storage device 40 and the eighth storage device 90, but compressing the first data D1 and storing the compressed first data in one of the three storage devices may be applied to the second to fifth data D2, D3, D4, and D5 without any change. That is, the second data D2 may be redundantly stored in the first, second and fourth storage devices 20, 30 and 50, but may be compressed only in the fourth storage device 50. Likewise, the third data D3 may be redundantly stored in the fifth, sixth and seventh storage devices 60, 70, and 80, but may be compressed only in the sixth storage device 70.

Furthermore, the fourth data D4 may be redundantly stored in the third, sixth and eighth storage devices 40, 70, and 90, but may be compressed only in the third storage device 40. Furthermore, the fifth data D5 may be redundantly stored in the fourth, fifth and seventh storage devices 50, 60, and 80, but may be compressed only in the fifth storage device 60.

The data processor 10 may classify three storage devices each redundantly storing each of the multiple pieces of data D1, D2, D3, D4, and D5, among the plurality of data storage devices 20, 30, 40, 50, 60, 70, 80, and 90, into a "first storage device", a "second storage device" and a "third storage device", respectively, and may classify the remaining storage devices as "general storage devices." In this case, each of the multiple pieces of non-compressed data D1, D2, D3, D4, and D5 may be stored in the "first storage device" and the "second storage device", and each of the multiple pieces of compressed data D1, D2, D3, D4, and D5 may be stored in the "third storage device." For example, the data processor 10 may classify the first storage device 20 of the plurality of data storage devices 20, 30, 40, 50, 60, 70, 80, and 90 as the "first storage device", may classify the third storage device 40 thereof as the "second storage device", may classify the eighth storage device 90 thereof as the "third storage device", and may classify the remaining second and fourth to seventh storage devices 30, 50, 60, 70, and 80 as "general storage devices", based on whether the first data D1 has been redundantly stored. For another example, the data processor 10 may classify the first storage device 20 thereof the plurality of data storage devices 20, 30, 40, 50, 60, 70, 80, and 90 as the "first storage device", may classify the second storage device 30 thereof as the "second storage device", may classify the fourth storage device 50 thereof as the "third storage device", and may classify the remaining third and fifth to eighth storage devices 40, 60, 70, 80, and 90 as the "general storage devices", based on whether the second data D2 has been redundantly stored. For another example, the data processor 10 may classify the fifth storage device 60 of the plurality of data storage devices 20, 30, 40, 50, 60, 70, 80, and 90 as the "first storage device", may classify the seventh storage device 80 thereof as the "second storage device", may classify the sixth storage device 70 thereof as the "third storage device", and may classify the remaining first to fourth and eighth storage devices 20, 30, 40, 50, and 90 as the "general storage devices", based on whether the third data D3 has been redundantly stored. For yet another example, the data processor 10 may classify the sixth storage device 70 of the plurality of data storage devices 20, 30, 40, 50, 60, 70, 80, and 90 as the "first storage device", may classify the eighth storage device 90 thereof as the "second storage device", may classify the third storage device 40 thereof as the "third storage device", and may classify the remaining first, second, fourth, fifth and seventh storage devices 20, 30, 50, 60, and 80 as the "general storage devices", based on whether the fourth data D4 has been redundantly stored. For still another example, the data processor 10 may classify the fourth storage device 50 among the plurality of data storage devices 20, 30, 40, 50, 60, 70, 80, and 90 as the "first storage device", may classify the seventh storage device 80 thereof as the "second storage device", may classify the fifth storage device 60 thereof as the "third storage device", and may classify the remaining first to third, sixth and eighth storage devices 20, 30, 40, 70, and 90 as the "general storage devices", based on whether the fifth data D5 has been redundantly stored.

Figure 2B:
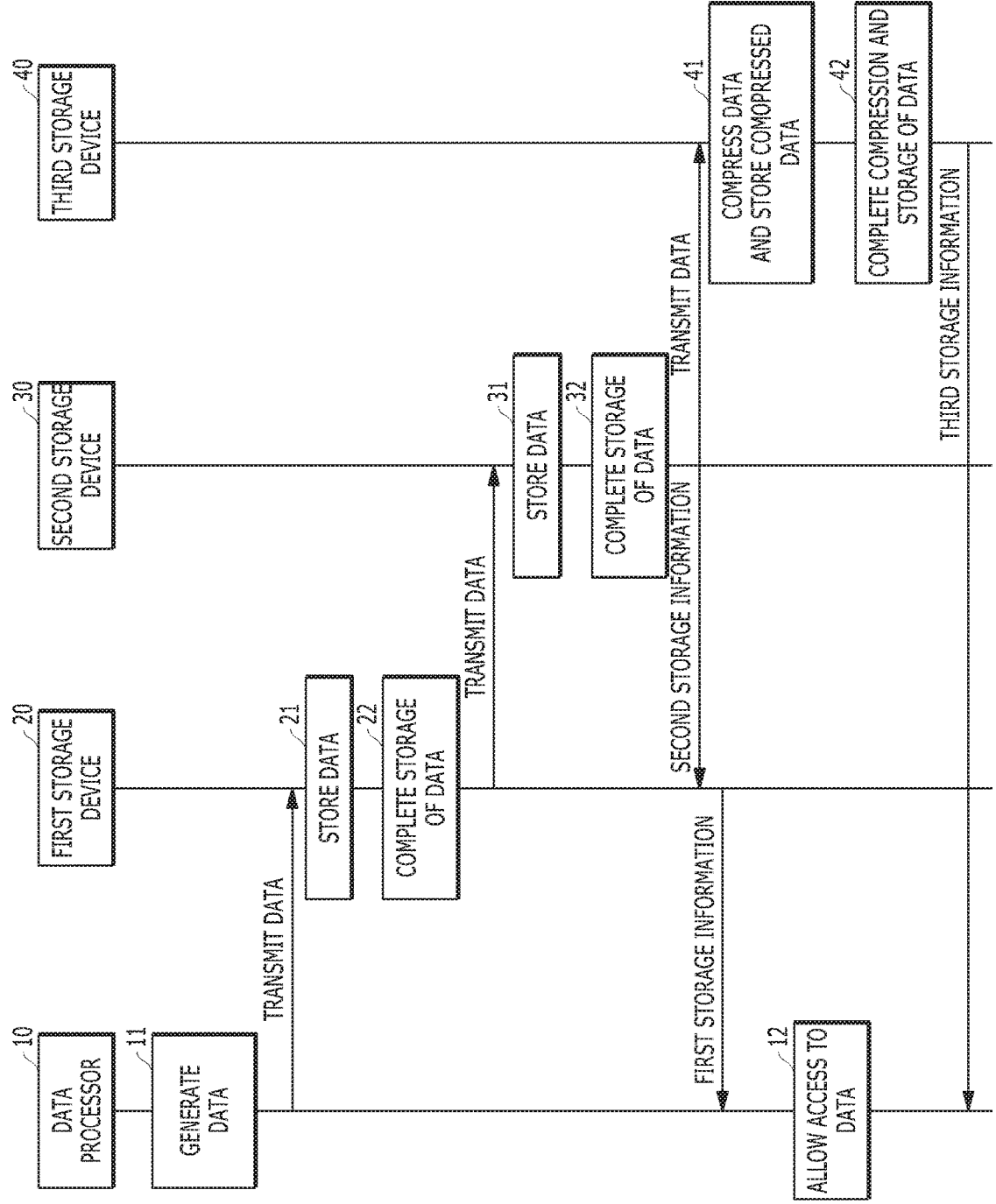

FIGS. 2A and 2B are diagrams illustrating examples of a data write operation of the data storage system according to various embodiments of the present disclosure.

First, the data storage system according to an embodiment may include the data processor 10 and the plurality of data storage devices 20, 30, 40, 50, 60, 70, 80, and 90 as described with reference to FIG. 1.

FIGS. 2A and 2B may be examples of a write operation of storing, in three storage devices 20, 30, and 40 of the plurality of data storage devices 20, 30, 40, 50, 60, 70, 80, and 90, data generated by the data processor 10. That is, in FIGS. 2A and 2B, the data processor 10 has selected the first storage device 20, second storage device 30 and third storage device 40 of the plurality of data storage devices 20, 30, 40, 50, 60, 70, 80, and 90 described with reference to FIG. 1 and has set the selected first storage device 20, second storage device 30 and third storage device 40 as the "first storage device", the "second storage device" and the "third storage device", respectively. Accordingly, in the following description, a reference numeral for a "first storage device" will be defined as "20" indicative of the first storage device. A reference numeral for a "second storage device" will be defined as "30" indicative of the second storage device. A reference numeral for a "third storage device" will be defined as "30" indicative of the third storage device.

For example, after generating the data (11), the data processor 10 may transmit the data to the first storage device 20.

The first storage device 20 may store, in the internal storage space thereof, the data received from the data processor 10 (21).

Furthermore, the first storage device 20 may transmit the data to the second storage device 30. According to an embodiment, referring to FIG. 2A, the first storage device 20 may transmit the data to the second storage device 30 in the section in which the operation 21 of storing the data in the internal storage space of the first storage device 20 is performed. Accordingly, a timing at which the storage of the data in the first storage device 20 is completed (22) may be later than the timing at which the data is transmitted to the second storage device 30. According to another embodiment, referring to FIG. 2B, after the operation 21 of storing the data in the internal storage space of the first storage device 20 is completed (22), the first storage device 20 may transmit the data to the second storage device 30. Accordingly, the timing at which the storage of the data in the first storage device 20 is completed (22) may be earlier than the timing at which the data is transmitted to the second storage device 30.

Furthermore, the first storage device 20 may not generate first storage information, indicating that the storage of the data in the internal storage space of the first storage device 20 is completed (22), at the timing at which the storage of the data in the internal storage space of the first storage device 20 is completed (22). That is, even after the storage of the data in the internal storage space of the first storage device 20 is completed (22), the first storage device 20 may not generate the first storage information until second storage information indicating that the storage of the data, transmitted to the second storage device 30, in the internal storage space of the second storage device 30 is completed is received from the second storage device 30. Accordingly, when the first storage device 20 generates the first storage information, this may mean the state in which the redundant storage of the data in the internal storage spaces of the first storage device 20 and the second storage device 30 has been completed. Furthermore, the first storage device 20 may generate the first storage information and transmit the generated first storage information to the data processor 10.

As described above, the data processor 10 may be aware that the data have been redundantly stored in the first storage device 20 and the second storage device 30 in response to the reception of the first storage information from the first storage device 20. Accordingly, the data processor 10 may allow an access operation for the data in response to the reception of the first storage information from the first storage device 20 (12).

Furthermore, the second storage device 30 may store, in its internal storage space, the data received from the first storage device 20 (31).

Furthermore, the second storage device 30 may transmit the data to the third storage device 40. According to an embodiment, referring to FIG. 2A, the second storage device 30 may transmit the data to the third storage device 40 in the section in which the operation 31 of storing the data in the internal storage space of the second storage device 30 is performed. Accordingly, a timing at which the storage of the data in the second storage device 30 is completed (32) may be later than the timing at which the data is transmitted to the third storage device 40. According to another embodiment, referring to FIG. 2B, the second storage device 30 may transmit the data to the third storage device 40 after the operation 31 of storing the data in the internal storage space of the second storage device 30 is completed (32). Accordingly, the timing at which the storage of the data in the second storage device 30 is completed (32) may be earlier than the timing at which the data is transmitted to the third storage device 40.

Furthermore, the second storage device 30 may generate the second storage information, indicating that the storage of the data in the internal storage space of the second storage device 30 is completed (32), at the timing at which the storage of the data in the internal storage space of the second storage device 30 is completed (32). That is, the second storage device 30 may generate the second storage information and transmit the generated second storage information to the first storage device 20 in response to the completion of the storage of the data in the internal storage space of the second storage device 30 (32), regardless of whether the storage of the data, transmitted to the third storage device 40, in the internal storage space of the third storage device 40 has been completed or not.

Furthermore, the third storage device 40 may compress the data received from the second storage device 30 and store the compressed data in the internal storage space thereof (41). That is, the third storage device 40 may compress the data received from the second storage device 30 so that the data have a smaller size than the data stored in each of the first storage device 20 and the second storage device 30, and may store the compressed data in the internal storage space of the third storage device 40.

Furthermore, the third storage device 40 may generate third storage information, indicating that the storage of the compressed data in the internal storage space of the third storage device 40 is completed (42), at a timing at which the storage of the compressed data in the internal storage space of the third storage device 40 is completed (42). At this time, the third storage device 40 does not need to transmit the generated third storage information to the second storage device 30 because the second storage device 30 has transmitted the second storage information to the first storage device 20 in response to the completion of the storage of the data in the internal storage space of the second storage device 30 (32), regardless of whether the data has been stored in the internal storage space of the third storage device 40 or not. That is, the third storage device 40 may directly transmit the generated third storage information to the data processor 10 in response to the completion of the storage of the compressed data in the internal storage space of the third storage device 40 (42).

The data stored in the third storage device 40 may not be directly accessed by the data processor 10 because the data is compressed. Furthermore, the data processor 10 may allow an access operation for the data (12) at the timing at which the redundant storage of the data in the internal storage spaces of the first storage device 20 and the second storage device 30 is completed, that is, at the timing at which the first storage information is received from the first storage device 20. Accordingly, the operation of compressing, by the third storage device 40, the data and storing the compressed data in the internal storage space of the third storage device 40 may be performed in parallel to the operation of allowing, by the data processor 10, access to the data from the first storage device 20 or the second storage device 30 (12). For example, the third storage device 40 may be performing the operation of compressing the data and storing the compressed data in the internal storage space of the third storage device 40, at the timing at which the data processor 10 accesses the data from the first storage device 20.

FIGS. 3A to 3D are diagrams illustrating examples of a data read operation of the data storage system according to various embodiments of the present disclosure.

FIGS. 3A to 3D illustrate the state in which the write operation described with reference to FIGS. 2A and 2B has been completed, that is, the state in which the data processor 10 has generated the data and has redundantly stored the generated data in the first storage device 20, the second storage device 30 and the third storage device 40, but the generated data has been compressed and stored in the third storage device 40. Accordingly, the data may have been stored in the first storage device 20 (23), the data may have been stored in the second storage device 30 (33), and the data may have been compressed and stored in the third storage device 40 (43).

Referring to (A) of FIG. 3A, the data processor 10 may transmit, to the first storage device 20, an access request for the data.

The first storage device 20 may attempt access to the data stored in the internal storage space of the first storage device 20 in response to the access request received from the data processor 10. When the access to the data is successful (24) as a result of the attempt, the first storage device 20 may transmit an access success response to the data processor 10.

In such a case, no operation may be performed on the second storage device 30 and the third storage device 40 because the first storage device 20 has succeeded in accessing the data to which access has been requested by the data processor 10.

Referring to (B) of FIG. 3A, the data processor 10 may transmit, to the first storage device 20, an access request for the data.

The first storage device 20 may attempt access to the data stored in the internal storage space of the first storage device 20 in response to the access request received from the data processor 10. When the access to the data fails (25) as a result of the attempt, the first storage device 20 may transmit an access failure response to the data processor 10.

The data processor 10 may transmit, to the second storage device 30, an access request for the data in response to the access failure response received from the first storage device 20. Furthermore, the data processor 10 may transmit, to the third storage device 40, a decompression request for the data in response to the access failure response received from the first storage device 20. That is, when the access failure response is received from the first storage device 20, the data processor 10 may transmit an access request to the second storage device 20 in which the non-compressed data have been stored, and may transmit the decompression request for the compressed data to the third storage device 40 in which the compressed data have been stored.

The second storage device 30 may attempt access to the data stored in the internal storage space of the second storage device 30 in response to the access request received from the data processor 10. When the access to the data is successful (34) as a result of the attempt, the second storage device 30 may transmit an access success response to the data processor 10.

The third storage device 40 may decompress the compressed data, stored in the internal storage space of the third storage device 40, in response to the decompression request received from the data processor 10 (44).

In this case, the operation of accessing the data stored in the internal storage space of the second storage device 30 and the operation of decompressing, by the third storage device 40, the data compressed and stored in the internal storage space of the third storage device 40 may be performed in parallel to each other.

Referring to FIG. 3B, the data processor 10 may transmit, to the first storage device 20, an access request for the data.

The first storage device 20 may attempt access to the data stored in the internal storage space thereof in response to the access request received from the data processor 10. When the access to the data fails (25) as a result of the attempt, the first storage device 20 may transmit an access failure response to the data processor 10.

The data processor 10 may transmit, to the second storage device 30, an access request for the data in response to the access failure response received from the first storage device 20. Furthermore, the data processor 10 may transmit, to the third storage device 40, a decompression request for the data in response to the access failure response received from the first storage device 20. That is, when the access failure response is received from the first storage device 20, the data processor 10 may transmit an access request to the second storage device 20 in which the data have been duplicated and non-compressed, and may transmit a decompression request for the data to the third storage device 40 in which the data have been duplicated and compressed.

The second storage device 30 may attempt access to the data stored in the internal storage space thereof in response to the access request received from the data processor 10. When the access to the data fails (36) as a result of the attempt, the second storage device 30 may transmit an access failure response to the data processor 10.

The data processor 10 may transmit, to the third storage device 40, an access request for the data in response to the access failure response received from the second storage device 30. At this time, the third storage device 40 may be performing the decompression operation on the compressed data, stored therein, in response to the decompression request received from the data processor 10 in accordance with the access failure response received from the first storage device 20. If the decompression operation for the compressed data stored in the internal storage space of the third storage device 40 has not been completed at the timing at which the access request is received from the data processor 10, the third storage device 40 may perform an access operation for the data in response to the access request received from the data processor 10, after the decompression operation is completed and the compressed data becomes decompressed.

The third storage device 40 may attempt access to the data stored in the internal storage space thereof in response to the access request received from the data processor 10. When the access to the data is successful (47) as a result of the attempt, the third storage device 40 may transmit an access success response to the data processor 10. When the access to the data by the third storage device 40 fails, the access operation for the data has finally failed, although not illustrated in FIG. 3B, Accordingly, the access operation for the data may not be completed normally.

FIG. 3C illustrates the state in which the read operation described with reference to (B) of FIG. 3A has been completed, that is, the state in which the access operation for the data, attempted by the data processor 10 with respect to the first storage device 20, has failed (25), the access operation for the data attempted with respect to the second storage device 30 has been successful (34), and the decompression request for the third storage device 40 has been completed and thus the decompressed data has been stored in the internal storage space of the third storage device 40. Accordingly, the data which has been stored in the first storage device 20, but to which access has failed may have been invalidated (26), the non-compressed data may have been stored in the second storage device 30 (33), and the decompressed data may have been stored in the third storage device 40 (45).

For example, the data which have been stored in the first storage device 20, but to which access has failed may be invalidated (26). Accordingly, the first storage device 20 may be reset as a general storage device, that is, the first storage device 20 in which the data is not redundantly stored (27). In other words, the first storage device 20 selected and set as the "first storage device" by the data processor 10, among the multiple storage devices 20, 30, 40, 50, 60, 70, 80, and 90, in FIGS. 2A and 2B may be reset (27) as the "general storage device", not the "first storage device" by the data processor 10, because the data stored in the internal storage space of the first storage device 20 is invalidated (26) in FIG. 3C.

Furthermore, after being stored in the second storage device 30, the data to which access has been successful may continue to be stored in the second storage device 20 (33). In this case, the data processor 10 has reset, as the "general storage device", the first storage device 20 previously selected and set as the "first storage device." Accordingly, the data processor 10 may reset, as a "first storage device", the second storage device 30 previously selected and set as the "second storage device." That is, the second storage device 30 selected and set as the "second storage device" by the data processor 10, among the multiple storage devices 20, 30, 40, 50, 60, 70, 80, and 90, in FIGS. 2A and 2B may be reset as the "first storage device" by the data processor 10 (35) in FIG. 3C.

Furthermore, after being compressed and stored in the third storage device 40, the data on which the decompression operation has been performed in response to the decompression request may have been stored in the third storage device 40 as decompressed (45). In this case, the data processor 10 has reset, as the "general storage device", the first storage device 20 previously selected and set as the "first storage device", and has reset, as the "first storage device", the second storage device 30 previously selected and set as the "second storage device." Accordingly, the data processor 10 may reset, as a "second storage device", the third storage device 40 previously selected and set as the "third storage device." That is, the third storage device 40 selected and set as the "third storage device" by the data processor 10, among the multiple storage devices 20, 30, 40, 50, 60, 70, 80, and 90, in FIGS. 2A and 2B may be reset as the "second storage device" by the data processor 10 (46) in FIG. 3C.

Furthermore, the data processor 10 may select and reset, as a "third storage device", the fourth storage device 50 classified as the "general storage device" by the data processor 10, among the multiple storage devices 20, 30, 40, 50, 60, 70, 80, and 90, because the data is not stored in the fourth storage device 50, in FIGS. 2A and 2B. That is, the fourth storage device 50 selected and set as the "general storage device" by the data processor 10, among the multiple storage devices 20, 30, 40, 50, 60, 70, 80, and 90, in FIGS. 2A and 2B may be reset as the "third storage device" by the data processor 10 (51) in FIG. 3C.

As described above, storage devices corresponding to the "first storage device", the "second storage device" and the "third storage device", respectively, may be reset due to the data to which access has failed. In summary, the "first storage device" has corresponded to the first storage device 20 in FIGS. 2A and 2B but may correspond to the second storage device 30 in FIG. 3C in which the resetting operation 35 has been performed. Likewise, the "second storage device" has corresponded to the second storage device 30 in FIGS. 2A and 2B but may correspond to the third storage device 40 in FIG. 3C in which the resetting operation 46 has been performed. Likewise, the "third storage device" has corresponded to the third storage device 40 in FIGS. 2A and 2B but may correspond to the fourth storage device 50 in FIG. 3C in which the resetting operation 51 has been performed. Accordingly, in the following description of FIG. 3C, a reference numeral for a "first storage device" will be defined as "30" indicative of the second storage device. A reference numeral for a "second storage device" will be defined as "40" indicative of the third storage device. A reference numeral for a "third storage device" will be defined as "50" indicative of the fourth storage device.

After the resetting operations 27, 35, 46, and 51, the first storage device 30 and the second storage device 40 may have stored therein the non-compressed data. In contrast, the third storage device 50 may have not stored therein the data. Accordingly, the data processor 10 may transmit, to the third storage device 50, the decompressed data stored in the second storage device 40.

The third storage device 50 may compress the decompressed data received from the second storage device 40 and store the compressed data in the internal storage space thereof (52). That is, the third storage device 50 may compress the decompressed data received from the second storage device 40 so that the compressed data has a smaller size than the non-compressed data stored in each of the first storage device 30 and the second storage device 40, and may store the compressed data in the internal storage space of the third storage device 50.

Furthermore, the third storage device 50 may generate third storage information, indicating that the storage of the compressed data in the internal storage space of the third storage device 50 is completed (53), at the timing at which the storage of the compressed data in the internal storage space of the third storage device 50 is completed (53). At this time, the third storage device 50 does not need to transmit the generated third storage information to the second storage device 40 because the second storage device 40 has already stored therein the non-compressed data. That is, the third storage device 50 may directly transmit the generated third storage information to the data processor 10 in response to the completion of the storage of the compressed data in the internal storage space of the third storage device 50 (53).

The data stored in the third storage device 50 may not be directly accessed by the data processor 10 because the data is compressed. Furthermore, as described with reference to FIG. 2B, the data processor 10 may be in state in which it has already allowed an access operation for the data (12) because the redundant storage of the data in the internal storage spaces of the first storage device 30 and the second storage device 40 has already been completed before the compressed data is stored in the third storage device 50. Accordingly, the operation of compressing, by the third storage device 50, the data and storing the compressed data in the internal storage space thereof may be performed in parallel to the operation of allowing, by the data processor 10, access to the data from the first storage device 30 or the second storage device 40. For example, at a timing at which the data processor 10 accesses the data from the first storage device 30, the third storage device 50 may be performing the operation of compressing the data and storing the compressed data in the internal storage space thereof.

Referring to FIG. 3D, the read operation described with reference to FIG. 3B has been completed, that is, the access operation for the data attempted by the data processor 10 with respect to the first storage device 20 has failed (25), the access operation for the data, subsequently attempted by the data processor 10 with respect to the second storage device 30, has also failed (36), and the decompression request for the third storage device 40 is completed and the access operation for the decompressed data attempted by the data processor 10 with respect to the third storage device 40 has been successful (47). Accordingly, the data which has been stored in the internal storage space of the first storage device 20, but to which access has failed may have been invalidated (26), the data which has been stored in the internal storage space of the second storage device 30, but to which access has failed may also have been invalidated (37), and the decompressed data may have been stored in the internal storage space of the third storage device 40 (45).

For example, the data which has been stored in the internal storage space of the first storage device 20, but to which access has failed may be invalidated (26). Furthermore, the data which has been stored in the internal storage space of the second storage device 30, but to which access has failed may be invalidated (37). However, the data may have been normally stored in the internal storage space of the third storage device 40 (45). That is, the data is just stored in the internal storage space of the third storage device 40 solely and may have not been duplicated and stored in any storage device. Accordingly, the data processor 10 may stop an access operation for the data (13).

In such a state, the first storage device 20 and the second storage device 30 may be reset as general storage devices, that is, the first storage device 20 and the second storage device 30 in which the data is not redundantly stored (27 and 38), respectively. In other words, the first storage device 20 selected and set as the "first storage device" by the data processor 10, among the multiple storage devices 20, 30, 40, 50, 60, 70, 80, and 90, in FIGS. 2A and 2B may be reset (27) as the "general storage device", not the "first storage device", by the data processor 10 because the data stored in the internal storage space of the first storage device 20 is invalidated (26) in FIG. 3D. Furthermore, the second storage device 30 selected and set as the "second storage device" by the data processor 10, among the multiple storage devices 20, 30, 40, 50, 60, 70, 80, and 90, in FIGS. 2A and 2B may be reset (38) as the "general storage device", not the "second storage device", by the data processor 10, because the data stored in the internal storage space of the second storage device 30 is invalidated (37) in FIG. 3D.

Furthermore, after being compressed and stored in the internal storage space of the third storage device 40, the data on which both the decompression operation and the access operation have been successful may continue to be stored as decompressed in the internal storage space of the third storage device 40 (45). In this case, the data processor 10 has reset, as the "general storage devices", the first and second storage devices 20 and 30 previously selected and set as the "first storage device" and the "second storage device", respectively. Accordingly, the data processor 10 may reset, as a "first storage device", the third storage device 40 previously selected and set as the "third storage device." That is, the third storage device 40 selected and set as the "third storage device" by the data processor 10, among the multiple storage devices 20, 30, 40, 50, 60, 70, 80, and 90, in FIGS. 2A and 2B may be reset (48) as the "first storage device" by the data processor 10 in FIG. 3D.

Furthermore, the data processor 10 may select and reset, as a "second storage device" and a "third storage device", the fourth and fifth storage devices 50 and 60 classified as the "general storage devices", respectively, by the data processor 10, among the multiple storage devices 20, 30, 40, 50, 60, 70, 80, and 90, because the data is not stored in the fourth and fifth storage devices 50 and 60 in FIGS. 2A and 2B. That is, the fourth and fifth storage devices 50 and 60 selected and set as the "general storage devices" by the data processor 10, among the multiple storage devices 20, 30, 40, 50, 60, 70, 80, and 90 in FIGS. 2A and 2B, may be reset as the "second storage device" and the "third storage device", respectively, by the data processor 10 (54 and 61) in FIG. 3C.

As described above, storage devices corresponding to the "first storage device", the "second storage device" and the "third storage device", respectively, may be reset due to the data to which access has failed. In summary, the "first storage device" has corresponded to the first storage device 20 in FIGS. 2A and 2B but may correspond to the third storage device 40 in FIG. 3D in which the resetting operation 48 has been performed. Likewise, the "second storage device" has corresponded to the second storage device 30 in FIGS. 2A and 2B but may correspond to the fourth storage device 50 in FIG. 3D in which the resetting operation 54 has been performed. Likewise, the "third storage device" has corresponded to the third storage device 40 in FIGS. 2A and 2B but may correspond to the fifth storage device 60 in FIG. 3D in which the resetting operation 61 has been performed. Accordingly, in the following description of FIG. 3D, a reference numeral for a "first storage device" will be defined as "40" indicative of the third storage device. A reference numeral for a "second storage device" will be defined as "50" indicative of the fourth storage device. A reference numeral for a "third storage device" will be defined as "60" indicative of the fifth storage device.

After the resetting operations 27, 38, 48, 54, and 61, the non-compressed data may have been stored in the first storage device 40. In contrast, the data may have not been stored in the second storage device 50 and the third storage device 60. Accordingly, the data processor 10 may transmit, to the second storage device 50, the non-compressed data stored in the first storage device 40.

The second storage device 50 may store, in the internal storage space thereof, the non-compressed data received from the first storage device 40 (55).

Furthermore, the second storage device 50 may transmit the non-compressed data to the third storage device 60. According to an embodiment, as illustrated in FIG. 3D, the second storage device 50 may transmit the non-compressed data to the third storage device 60 in the section in which the operation 55 of storing the non-compressed data in the internal storage space of the second storage device 50 is performed. Accordingly, a timing at which the storage of the non-compressed data in the second storage device 50 is completed (56) may be later than the timing at which the second storage device 50 transmits the non-compressed data to the third storage device 60. According to another embodiment, unlike the case of FIG. 3D, the second storage device 50 may transmit the non-compressed data to the third storage device 60 after the operation 55 of storing the non-compressed data in the internal storage space of the second storage device 50 is completed (56). Accordingly, the timing at which the storage of the non-compressed data in the second storage device 50 is completed (56) may be earlier than the timing at which the second storage device 50 transmits the non-compressed data to the third storage device 60.

Furthermore, the second storage device 50 may generate second storage information, indicating that the storage of the non-compressed data in the internal storage space of the second storage device 50 is completed (56), at the timing at which the storage of the non-compressed data in the internal storage space of the second storage device 50 is completed (56). That is, the second storage device 50 may generate the second storage information in response to the completion of the storage of the non-compressed data in the internal storage space of the second storage device 50 (56) and may transmit the generated second storage information to the first storage device 40.

At this time, the first storage device 40 may generate first storage information in response to the reception of the second storage information from the second storage device 50 because the decompressed data has already been stored in the first storage device 40, and may transmit the generated first storage information to the data processor 10.

The data processor 10 may be aware that the non-compressed data have been redundantly stored in the first storage device 40 and the second storage device 50 in response to the reception of the first storage information from the first storage device 40. Accordingly, the data processor 10 may allow an access operation for the data again in response to the reception of the first storage information from the first storage device 40 (12).

Furthermore, the third storage device 60 may compress the non-compressed data received from the second storage device 50 and store the compressed data in the internal storage space thereof (62). That is, the third storage device 60 may compress the non-compressed data received from the second storage device 50 so that the compressed data have a smaller size than the non-compressed data stored in each of the first storage device 40 and the second storage device 50, and may store the compressed data in the internal storage space of the third storage device 60.

Furthermore, the third storage device 60 may generate third storage information, indicating that the storage of the compressed data in the internal storage space of the third storage device 60 is completed (63), at the timing at which the storage of the compressed data in the internal storage space of the third storage device 60 is completed (63). At this time, the third storage device 60 does not need to transmit the generated third storage information to the second storage device 50 because the second storage device 50 has transmitted the second storage information to the first storage device 40 in response to the completion of the storage of the non-compressed data in the internal storage space of the second storage device 50 (56). That is, the third storage device 60 may directly transmit the generated third storage information to the data processor 10 in response to the completion of the storage of the compressed data in the internal storage space of the third storage device 60 (63).

The data stored in the third storage device 60 may not be directly accessed by the data processor 10 because the data is compressed. Furthermore, the data processor 10 may allow an access operation for the data again (12) at the timing at which the redundant storage of the data in the internal storage spaces of the first storage device 40 and the second storage device 50 is completed, that is, the timing at which the first storage information is received from the first storage device 40. Accordingly, the operation of compressing, by the third storage device 60, the data and storing the compressed data in the internal storage space thereof may be performed in parallel to the operation 12 of allowing, by the data processor 10, access to the data from the first storage device 40 or the second storage device 50. For example, the third storage device 60 may be performing the operation of compressing the data and storing the compressed data in the internal storage space thereof, at the timing at which the data processor 10 accesses the data from the first storage device 40.

Figure 4:
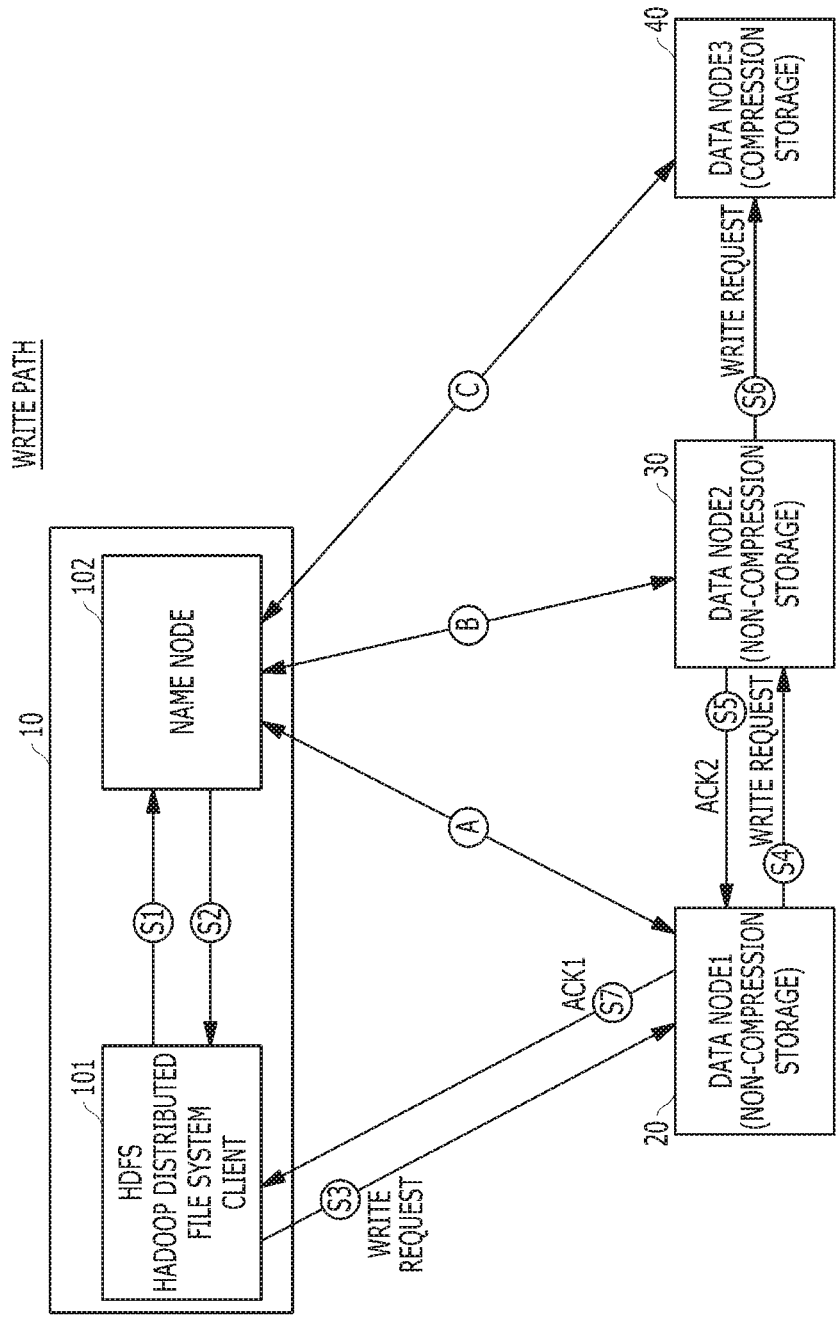
FIG. 4 is a diagram illustrating a data write operation of the data storage system, applied to an HDFS, according to an embodiment of the present disclosure.

FIG. 4 is a diagram illustrating a data write operation of the data storage system, applied to a Hadoop distributed file system (HDFS), according to an embodiment of the present disclosure.

Referring to FIG. 4, the data processor 10, applied to the HDFS, according to an embodiment may include an HDFS client 101 and a name node 102.

Furthermore, three data nodes 20, 30, and 40 connected to the HDFS have been set as a "first data node", a "second data node" and a "third data node", respectively, corresponding to the first storage device 20, the second storage device 30, and the third storage device 40 selected among the plurality of data storage devices 20, 30, 40, 50, 60, 70, 80, and 90 described above with reference to FIG. 1. Accordingly, in the following description, a reference numeral for the "first data node" will be defined as "20" indicative of the first storage device. A reference numeral for the "second data node" will be defined as "30" indicative of the second storage device. A reference numeral for the "third data node" will be defined as "40" indicative of the third storage device.

In an embodiment, the HDFS client 101 may be a Hadoop client, and may perform a function for requesting data write, data read, etc. from the multiple data nodes 20, 30, and 40 in cooperation with the name node 102.

Furthermore, when the HDFS client 101 requests data write from the multiple data nodes 20, 30, and 40, the name node 102 may notify the data nodes 20, 30, and 40 with information on how and in which data node data for the write request made by the HDFS client 101 will be stored, and may manage the information.

In an embodiment, the HDFS client 101 may first access the name node 102 before transmitting the data write request to the multiple data nodes 20, 30, and 40, and may check whether the write request can be performed. If the write request can be performed, the HDFS client 101 may check on which data node a write operation can be performed (S1). When receiving an answer indicating that the write request can be performed from the name node 102 (S2), the HDFS client 101 may transmit the write request to the multiple data nodes 20, 30, and 40.

First, the HDFS client 101 may transmit the write request to the first data node 20 (S3).

The first data node 20 may store non-compressed write data in the internal storage space thereof in response to the write request received from the HDFS client 101. At this time, the first data node 20 may receive an indication for the non-compression of the write data from the name node 102 (A). That is, when receiving the write request and the write data from the HDFS client 101, the first data node 20 receives the indication for the non-compression of the write data from the name node 102, and may store the non-compressed write data in the internal storage space of the first data node 20. Furthermore, the first data node 20 may transmit, to the second data node 30, the write request received from the HDFS client 101, separately from the operation of storing the non-compressed write data in the internal storage space of the first data node 20 (S4).

The second data node 30 may store the non-compressed write data in the internal storage space thereof in response to the write request received from the first data node 20. At this time, the second data node 30 may receive an indication for the non-compression of the write data from the name node 102 (B), That is, when receiving the write request and the write data from the first data node 20, the second data node 30 may receive the indication for the non-compression of the write data from the name node 102, and may store the non-compressed write data in the internal storage space of the second data node 30. Furthermore, the second data node 30 may transmit, to the third data node 40, the write request received from the first data node 20, separately from the operation of storing the non-compressed write data in the internal storage space of the second data node 30 (S6).

The third data node 40 may store the compressed write data in the internal storage space thereof in response to the write request received from the second data node 30. At this time, the third data node 40 may receive an indication for the compression of the write data from the name node 102 (C). That is, when receiving the write request and the write data from the second data node 30, the third data node 40 may receive the indication for the compression of the write data from the name node 102, and may store the compressed write data in the internal storage space of the third data node 40.

Furthermore, the second data node 30 may transmit a storage completion acknowledgement ACK2 to the first data node 20 in response to the completion of the operation of storing the non-compressed write data in the internal storage space of the second data node 30 (S5). At this time, the second data node 30 may notify the name node 102 that the operation of storing the non-compressed write data in the internal storage space of the second data node 30 has been completed, separately from the operation of transmitting the storage completion acknowledgement ACK2 to the first data node 20 (B).

Furthermore, the first data node 20 may transmit a storage completion acknowledgement ACK1 to the HDFS client 101 in response to the completion of the operation of storing the non-compressed write data in the internal storage space of the first data node 20 and the reception of the storage completion acknowledgement ACK2 from the second data node 30 (S7). At this time, the first data node 20 may notify the name node 102 that the operation of storing the non-compressed write data in the internal storage space of the first data node 20 has been completed, separately from the operation of transmitting the storage completion acknowledgement ACK1 to the HDFS client 101 (A).

After receiving the storage completion acknowledgement ACK1 from the first data node 20, the HDFS client 101 may start an access operation for the write data.

Furthermore, the third data node 40 may notify the name node 102 that the operation of storing the compressed write data in the internal storage space of the third data node 40 has been completed (C).

Through the aforementioned operation, the name node 102 may check that the non-compressed write data has been stored in the first data node 20 and the second data node 30 and the compressed write data has been stored in the third data node 40.

FIG. 5 is a diagram illustrating a data read operation of the data storage system, applied to an HDFS, according to an embodiment of the present disclosure.

Referring to FIG. 5, the data processor 10, applied to the HDFS, according to an embodiment may include an HDFS client 101 and a name node 102.

Furthermore, three data nodes 20, 30, and 40 connected to the HDFS have been set as a "first data node", a "second data node" and a "third data node", respectively, corresponding to the first storage device 20, the second storage device 30, and the third storage device 40 selected among the plurality of data storage devices 20, 30, 40, 50, 60, 70, 80, and 90 described above with reference to FIG. 1. Accordingly, in the following description, a reference numeral for the "first data node" will be defined as "20" indicative of the first storage device. A reference numeral for the "second data node" will be defined as "30" indicative of the second storage device. A reference numeral for the "third data node" will be defined as "40" indicative of the third storage device.

In an embodiment, the HDFS client 101 may be a Hadoop client, and may perform a function for requesting data write, data read, etc. from the multiple data nodes 20, 30, and 40 in cooperation with the name node 102.

Furthermore, when the HDFS client 101 requests data read from the multiple data nodes 20, 30, and 40, the name node 102 may notify the data nodes 20, 30, and 40 of information on how and in which data node data for the read request made by the HDFS client 101 has been stored, and may manage the information.

In an embodiment, the HDFS client 101 may first access the name node 102 before transmitting the data read request to the multiple data nodes 20, 30, and 40, and may check whether the read request can be performed. If the read request can be performed, the HDFS client 101 may check in which data node read data has been stored (F1). When receiving an answer indicating that the read request can be performed from the name node 102 (F2), the HDFS client 101 may transmit the read request to the multiple data nodes 20, 30, and 40.

At this time, the state indicating how and which data has been stored in the multiple data nodes 20, 30, and 40 before the HDFS client 101 performs the read request may be the state in which the write operation described above with reference to FIG. 4 has been completed. That is, specific data may have been duplicated and redundantly stored in the first data node 20, the second data node 30, and the third data node 40. In this case, non-compressed specific data have been stored in each of the first data node 20 and the second data node 30 and compressed specific data have been stored in the third data node 40.

In such a state, the HDFS client 101 may transmit the read request to the first data node 20 (F3). The first data node 20 may read the specific data stored therein in response to the read request from the HDFS client 101 and may transmit the read specific data to the HDFS client 101. However, in FIG.

5, a case where the operation of reading the specific data from the first data node 20 fails (F4) will be described.

Since the operation of reading the specific data from the first data node 20 has failed (F4), the HDFS client 101 may additionally transmit the read request to the second data node 30 (F5). The second data node 30 may read the specific data stored therein in response to the read request from the HDFS client 101 and may transmit the read specific data to the HDFS client 101 (F6).

In this case, since the operation of reading the specific data from the first data node 20 fails (F4), the HDFS client 101 may request the decompression of the compressed specific data stored in the internal storage space of the third data node 40 through the name node 102 (F7) regardless of the success or failure of the read operation by the second data node 30.

The third data node 40 may perform the decompression operation on the compressed specific data, stored in the internal storage space therein, in response to the decompression request from the name node 102.

The third data node 40 may notify the name node 102 that the execution of the decompression operation for the specific data has been completed (F8).

Through the aforementioned operation, the name node 102 may check that the decompressed specific data have been stored in the third data node 40 in addition to the first data node 20 and the second data node 30.

For reference, although not specifically illustrated, after the operation of decompressing the compressed specific data in the third data node 40, the HDFS client 101 and the name node 102 will additionally set a new data node and will operate so that compressed specific data is stored in the storage space of the additionally set new data node. Furthermore, after the operation of decompressing the compressed specific data in the third data node 40, the HDFS client 101 and the name node 102 may invalidate specific data stored in a data node for which a read request has previously failed, that is, specific data stored in the storage space of the first data node 20. Accordingly, the HDFS client 101 and the name node 102 may operate so that specific data are redundantly stored in the three data nodes, but non-compressed specific data are stored in the two of the three data nodes and compressed specific data are stored in the remaining one node.

This technology can minimize a space occupied by data by compressing some data and storing compressed data in a data storage system in which the data are redundantly duplicated and used for big data processing.

Although various embodiments have been described for illustrative purposes, it will be apparent to those skilled in the art that various changes and modifications may be made without departing from the spirit and scope of the disclosure as defined in the following claims.

What is claimed is:

1. An operating method of a data storage system comprising a processor and multiple storage devices, the operating method comprising:
   a first storage operation of selecting a first storage device, a second storage device, and a third storage device among the multiple storage devices and transmitting and storing retention data generated by the processor in the first storage device and transmitting and storing the retention data from the first storage device to the second storage device;
   a second storage operation of transmitting, to the third storage device, the retention data from the second storage device and compressing and storing the retention data in the third storage device;
   a first access operation of accessing the retention data stored in the first storage device, by the processor, after the first storage operation is completed;
   a second access operation of accessing the retention data stored in the second storage device when fail of the first access operation, and
   a third storage operation of decompressing the compressed retention data stored in the third storage device when fail of the first access operation,
   wherein the second access operation and the third storage operation are performed in parallel, and the retention data generated by the processor is redundantly duplicated in the first storage device, the second storage device, and the third storage device.

2. The operating method of claim 1, wherein the first access operation and the second storage operation are performed in parallel.

3. The operating method of claim 2, wherein the third storage operation comprises:
   an operation of decompressing the compressed retention data stored in the third storage device when fail of the first access operation; and
   an operation of continuing to store the decompressed retention data in the third storage device after the operation of decompressing.

4. The operating method of claim 3, further comprising:
   a reselecting operation of reselecting the second storage device as a new first storage device, reselecting the third storage device as a new second storage device, and then selecting a new third storage device among the multiple storage devices, after the third storage operation; and
   an operation of storing the compressed retention data in the new third storage device by performing the second storage operation with the new third storage device after the reselecting operation.

5. The operating method of claim 1, wherein the first storage operation comprises:
   a fourth storage operation of transmitting, to the first storage device, the retention data generated by the processor and then storing the retention data in the first storage device; and
   a fifth storage operation of transmitting the retention data from the first storage device to the second storage device and then storing the retention data in the second storage device.

6. The operating method of claim 5, wherein the fourth storage operation and the fifth storage operation are performed in parallel.

7. An operating method of a data storage system comprising a processor and multiple storage devices, the operating method comprising:
   a first storage operation of selecting a first storage device, a second storage device and a third storage device among the multiple storage devices and transmitting and storing retention data generated by the processor in the first storage device and transmitting and storing the retention data stored in the first storage device to the second storage device;
   a second storage operation of transmitting, to the third storage device, the retention data from the second storage device and compressing and storing the retention data in the third storage device;
   a first access operation of accessing the retention data stored in the first storage device, by the processor, after first storage information and second storage information are transmitted to the processor, the first and second storage information respectively indicating that the storage of the retention data in the first and second storage devices is completed;

a second access operation of accessing the retention data stored in the second storage device when fail of the first access operation; and a third storage operation of decompressing the compressed retention data stored in the third storage device when fail of the first access operation, wherein the second access operation and the third storage operation are performed in parallel, and the retention data generated by the processor is redundantly duplicated in the first storage device, the second storage device, and the third storage device.

8. The operating method of claim 7, wherein the first access operation and the second storage operation are performed in parallel.

9. The operating method of claim 8, wherein the third storage operation comprises:

an operation of decompressing the compressed retention data stored in the third storage device when fail of the first access operation; and an operation of continuing to store the decompressed retention data in the third storage device after the operation of decompressing.

10. The operating method of claim 9, further comprising:

a reselecting operation of reselecting the second storage device as a new first storage device, reselecting the third storage device as a new second storage device, and then selecting a new third storage device among the multiple storage devices, after the third storage operation; and an operation of storing the compressed retention data in the new third storage device by performing the second storage operation with the new third storage device after the reselecting operation.

11. The operating method of claim 7, wherein the first storage operation comprises:

a fourth storage operation of transmitting, to the first storage device, the retention data generated by the processor and then storing the retention data in the first storage device;

a fifth storage operation of transmitting the retention data stored in the first storage device to the second storage device and then storing the retention data in the second storage device;

a first transmission operation of generating, by the second storage device, the second storage information in response to the completion of the fifth storage operation and transmitting the second storage information to the first storage device; and a second transmission operation of generating, by the first storage device, the first storage information in response to the completion of the fourth storage operation and transmitting the first storage information to the processor, after the first transmission operation.

12. The operating method of claim 11, wherein the fourth storage operation and the fifth storage operation are performed in parallel.

13. A data storage system comprising:
multiple storage devices; and a processor configured to:

store, redundantly duplicated in a first storage device, a second storage device, and a third storage device of the multiple storage devices, retention data generated within the processor, wherein the retention data are stored as non-compressed in the first storage device and the second storage device and the retention data are stored as compressed in the third storage device; and access the retention data stored in the first storage device, and then access the retention data stored in the second storage device while decompressing the compressed retention data stored in the third storage device when failing to access the retention data stored in the first storage device.

14. The data storage system of claim 13, wherein:

the processor is further configured to generate the retention data and transmit the retention data to the first storage device, the first storage device is configured to store, in the first storage device, the non-compressed retention data, received from the processor then transmitting, to the second storage device, the non-compressed retention data stored in the first storage device, the second storage device is configured to store, in the second storage device, the non-compressed retention data, received from the first storage device, then transmitting, to the third storage device, the non-compressed retention data stored in the second storage device, and the third storage device is configured to compress the non-compressed retention data, received from the second storage device, and store the compressed retention data in the third storage device.

15. The data storage system of claim 14, wherein:

the second storage device is further configured to generate second storage information in response to the completion of the storage of the non-compressed retention data, received from the first storage device, in the second storage device and transmit the second storage information to the first storage device, the first storage device is further configured to generate first storage information in response to the completion of the storage of the non-compressed retention data, received from the processor, in the first storage device and the reception of the second storage information from the second storage device, and transmit the first storage information to the processor, the processor is further configured to access the retention data stored in the first storage device or the second storage device in response to the reception of the first storage information from the first storage device, and the third storage device is further configured to generate third storage information in response to the completion of the storage of the compressed retention data stored in the third storage device and transmit the third storage information to the processor.

16. The data storage system of claim 15, wherein an operation of compressing and storing the non-compressed retention data, by the third storage device, and an operation of accessing the retention data stored in the first storage device or the second storage device, by the processor, are performed in parallel.

* * * * *